US012663672B2

(12) United States Patent
Kadotani et al.

(10) Patent No.: US 12,663,672 B2
(45) Date of Patent: Jun. 23, 2026

(54) LIGHT TRANSMISSIVE OPTICAL ELEMENT MODULE AND ELECTRONIC INSTRUMENT

(71) Applicant: SEIKO EPSON CORPORATION, Tokyo (JP)

(72) Inventors: Norikazu Kadotani, Azumino (JP); Yuki Naito, Matsumoto (JP); Tomoaki Miyashita, Shimosuwa-machi (JP); Masanobu Nakanishi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 265 days.

(21) Appl. No.: 18/366,774

(22) Filed: Aug. 8, 2023

(65) Prior Publication Data
US 2024/0045253 A1 Feb. 8, 2024

(30) Foreign Application Priority Data
Aug. 8, 2022 (JP) ................................. 2022-126684

(51) Int. Cl.
*G02F 1/13* (2006.01)
*G02F 1/1333* (2006.01)
(Continued)

(52) U.S. Cl.
CPC ..... *G02F 1/133385* (2013.01); *G03B 21/006* (2013.01); *G03B 21/16* (2013.01); *H04N 9/3144* (2013.01)

(58) Field of Classification Search
CPC .... G03B 21/005; G03B 21/006; G03B 21/16; G03B 21/145; H04N 9/315; H04N 9/3141;
(Continued)

(56) References Cited

U.S. PATENT DOCUMENTS

| | | | |
|---|---|---|---|
| 7,938,543 B2* | 5/2011 | Gerets | G03B 21/16 353/52 |
| 2003/0147036 A1* | 8/2003 | Kaise | H04N 9/3105 349/161 |

(Continued)

FOREIGN PATENT DOCUMENTS

| | | |
|---|---|---|
| CN | 211375293 U | 8/2020 |
| JP | 2004-139018 A | 5/2004 |

(Continued)

*Primary Examiner* — Sultan Chowdhury
(74) *Attorney, Agent, or Firm* — Dority & Manning, P.A.

(57) ABSTRACT

A light transmissive optical element module includes an optical device having a light transmissive optical element that causes light incident thereon to exit and a heat transfer surface via which heat of the light transmissive optical element is transferred, a heat diffuser that includes a contact section in contact with the heat transfer surface and an extension extending from the contact section and diffuses the received heat, a thermoelectric conversion device that has a first surface in contact with the extension and a second surface disposed at a side opposite from the first surface, absorbs via the first surface the heat transferred from the extension, and dissipates the absorbed heat via the second surface, and a cooler in contact with the second surface.

12 Claims, 12 Drawing Sheets

(51) Int. Cl.
    *G03B 21/00*         (2006.01)
    *G03B 21/16*         (2006.01)
    *H04N 9/31*          (2006.01)

(58) Field of Classification Search
    CPC ................ H04N 9/3144; H04N 9/3194; G02F
                     1/133308; G02F 1/133628; G02F
                                   1/133385
    See application file for complete search history.

(56)            References Cited

U.S. PATENT DOCUMENTS

| | | |
|---|---|---|
| 2004/0036834 A1 | 2/2004 | Oshnishi et al. |
| 2005/0117077 A1* | 6/2005 | Utsunomiya .......... G03B 21/16 |
| | | 349/5 |
| 2006/0209266 A1* | 9/2006 | Utsunomiya .......... G03B 21/16 |
| | | 353/54 |
| 2010/0245778 A1* | 9/2010 | Yanagisawa ........... G03B 21/16 |
| | | 353/54 |
| 2015/0156466 A1 | 6/2015 | Nagatsu et al. |
| 2018/0149952 A1 | 5/2018 | Matsumoto et al. |
| 2022/0394874 A1 | 12/2022 | Masuda et al. |

FOREIGN PATENT DOCUMENTS

| | | |
|---|---|---|
| JP | 2004-071969 A | 6/2004 |
| JP | 2005-114997 A | 4/2005 |
| JP | 2009-048043 A | 3/2009 |
| JP | 2009-229955 A | 10/2009 |
| JP | 2015-108697 A | 6/2015 |
| JP | 2015-225209 A | 12/2015 |
| JP | 2018-084726 A | 5/2018 |
| WO | WO 2021/095255 | 5/2021 |

* cited by examiner

LIGHT TRANSMISSIVE OPTICAL ELEMENT MODULE AND ELECTRONIC INSTRUMENT

The present application is based on, and claims priority from JP Application Serial Number 2022-126684, filed Aug. 8, 2022, the disclosure of which is hereby incorporated by reference herein in its entirety.

BACKGROUND

1. Technical Field

The present disclosure relates to a light transmissive optical element module and an electronic instrument.

2. Related Art

There has been a known projector that forms an image according to image information and projects the formed image (see JP-A-2015-108697, for example).

The projector described in JP-A-2015-108697 includes liquid crystal panels that modulate light incident thereon and a cooling apparatus that cools the liquid crystal panels. The cooling apparatus includes an optical element holder, a liquid pumping section, a supply tank, a heat exchanger unit, a plurality of tubular members, and a cooling fan. Out of the components described above, the optical element holder section has a channel in which a cooling liquid flows and holds the liquid crystal panels. The heat exchanger unit is coupled to the optical element holder via the plurality of tubular members. The cooling liquid flows to the heat exchanger unit from the optical element holder. The heat exchanger unit includes a heat receiver, a Peltier device as a thermoelectric converter, a heat sink, and other components. The heat receiver receives heat of the liquid crystal panels via the optical element holder and the cooling liquid, and the Peltier device conducts the heat received by the heat receiver to the heat sink. The cooling fan then blows cooling air to the heat sink to dissipate the heat from the heat sink.

As described above, the projector described in JP-A-2015-108697, in which the heat source, which is the liquid crystal panels, is cooled by the liquid refrigerant, provides a better effect of cooling the heat source when the temperature of the liquid refrigerant is low than a cooling scheme in which cooling air is caused to flow to cool the heat source.

However, since the specific heat of the liquid refrigerant is relatively high, it takes time to lower the temperature of the liquid refrigerant to a temperature suitable for cooling the heat source. The configuration described in JP-A-2015-108697 therefore has a problem of a difficulty in quickly cooling the heat source when the temperature of the liquid refrigerant is higher than the temperature suitable for cooling the heat source.

SUMMARY

A light transmissive optical element module according to a first aspect of the present disclosure includes an optical device having a light transmissive optical element that causes light incident thereon to exit and a heat transfer surface via which heat of the light transmissive optical element is transferred, a heat diffuser that includes a contact section in contact with the heat transfer surface and an extension extending from the contact section and diffuses the received heat, a thermoelectric conversion device that has a first surface in contact with the extension and a second surface disposed at a side opposite from the first surface, absorbs via the first surface the heat transferred from the extension, and dissipates the absorbed heat via the second surface, and a cooler in contact with the second surface.

An electronic instrument according to a second aspect of the present disclosure includes the light transmissive optical element module according to the first aspect described above.

BRIEF DESCRIPTION OF THE DRAWINGS

FIG. 6 is a cross-sectional view showing the transmissive liquid crystal panel in the first embodiment.

FIG. 7 is a side view showing the transmissive liquid crystal panel and a driver viewed in the first embodiment.

FIG. 11 is a block diagram showing the configuration of the temperature adjuster in the second embodiment.

DESCRIPTION OF EMBODIMENTS

First Embodiment

A first embodiment of the present disclosure will be described below with reference to the drawings.
Schematic Configuration of Projector FIG. 1 is a diagrammatic view showing the configuration of a projector 1 according to the present embodiment.

The projector 1 according to the present embodiment is an image display apparatus that modulates light outputted from a light source apparatus 31 provided in the projector 1 to form image light according to image information and enlarges and projects the formed image light on a projection receiving surface, such as a screen. The projector 1 is an example of the electronic instrument according to the present disclosure.

Figure 1:
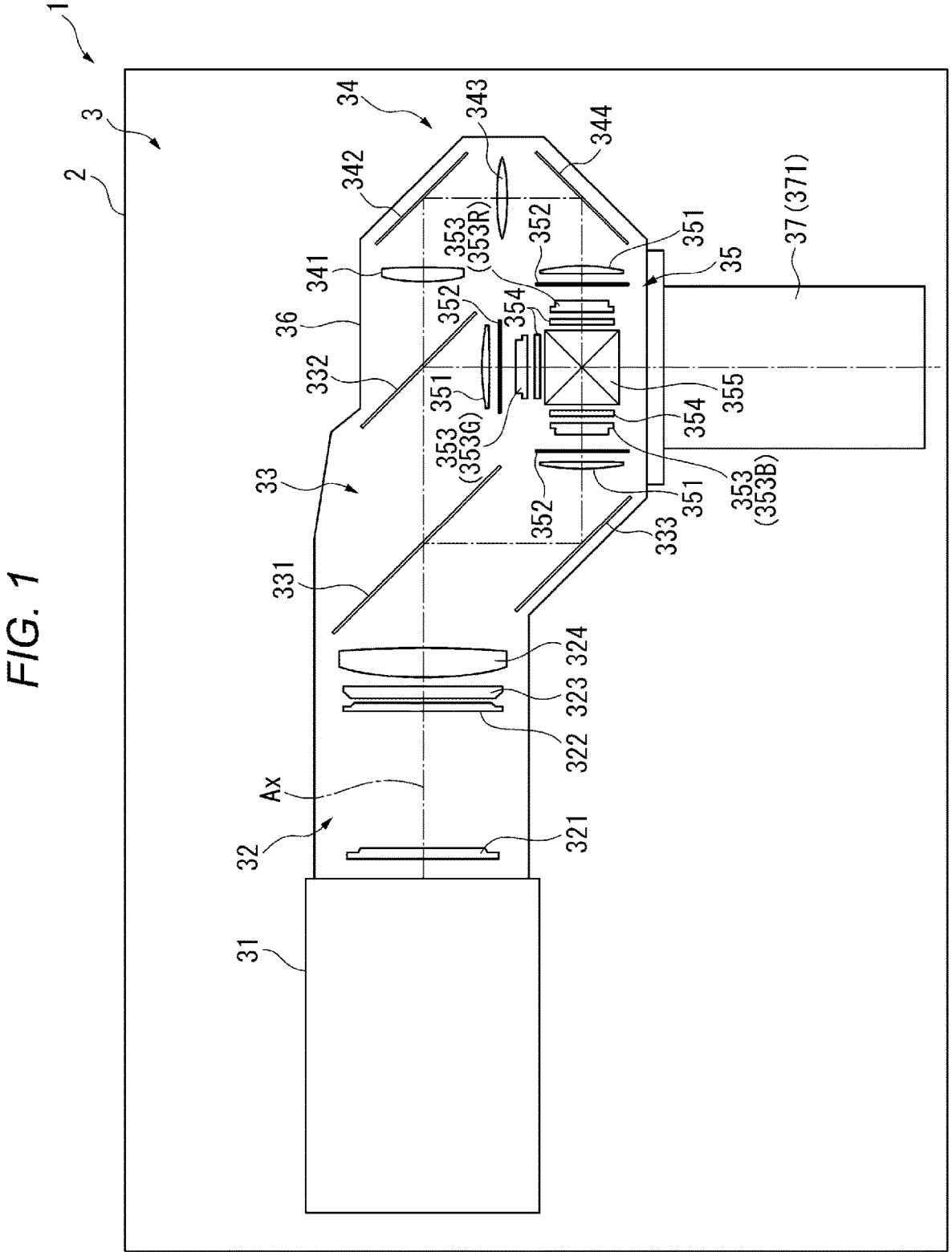
FIG. 1 is a diagrammatic view showing the configuration of a projector in a first embodiment.

The projector 1 includes an exterior enclosure 2 and an image projection apparatus 3 housed in the exterior enclosure 2, as shown in FIG. 1. In addition to the components described above, the projector 1 includes, although not shown, a controller that controls the operation of the projector 1, a power supply that supplies electronic parts that constitute the projector 1 with electric power, and a cooling apparatus that cools a cooling target that constitutes the projector 1.
Configuration of Image Projection Apparatus The image projection apparatus 3 forms image light according to image information inputted from the controller and projects the formed image light. The image projection apparatus 3 includes a light source apparatus 31, a homogenizing system 32, a color separation system 33, a relay system 34, an image formation apparatus 35, an optical part enclosure 36, and a projection optical apparatus 37.

The light source apparatus 31 outputs illumination light to the homogenizing system 32. The configuration of the light source apparatus 31 may be exemplified by a configuration including a solid-state light source that emits blue light that is excitation light and a wavelength converter that converts at least part of the blue light emitted from the solid-state light source into fluorescence containing green light and red light. Another configuration of the light source apparatus 31 may be exemplified by a configuration including a light source lamp, such as an ultrahigh-pressure mercury lamp or a configuration including light emitters that separately emit blue light, green light, and red light.

The homogenizing system 32 homogenizes the light outputted from the light source apparatus 31. The homogenized light travels via the color separation system 33 and the relay system 34 and illuminates a modulation region of each transmissive liquid crystal panel 353, which will be described later. The homogenizing system 32 includes two lens arrays 321 and 322, a polarization converter 323, and a superimposing lens 324.

The color separation system 33 separates the light incident from the homogenizing system 32 into red light, greenlight, and blue light. The color separation system 33 includes two dichroic mirrors 331 and 332 and a reflection mirror 333, which reflects the blue light separated by the dichroic mirror 331.

The relay system 34 is provided in the optical path of the red light, which is longer than the optical paths of the other color light, and suppresses loss of the red light. The relay system 34 includes a light-incident-side lens 341, a relay lens 343, reflection mirrors 342 and 344. In the present embodiment, the red light is guided to the relay system 34, but not necessarily. For example, the blue light may have an optical path longer than those of the other color light, and the blue light may be guided to the relay system 34.

The image formation apparatus 35 modulates the red light, the green light, and the blue light incident thereon and combines the modulated red light, green light, and blue light with one another to form image light. The image formation apparatus 35 includes three field lenses 351, three light-incident-side polarizers 352, three transmissive liquid crystal panels 353, three light-exiting-side polarizers 354, which are provided in accordance with the incident red light, green light, and blue light, and one color combing system 355.

The transmissive liquid crystal panels 353 modulate the light outputted from the light source apparatus 31 based on an image signal inputted from the controller. Specifically, the transmissive liquid crystal panels 353 modulate the red light, green light, and blue light incident via the light-incident-side polarizers 352 in accordance with the image signal inputted from the controller, and outputs the modulated red light, green light, and blue light. The three transmissive liquid crystal panels 353 include a transmissive liquid crystal panel 353R for red light, a transmissive liquid crystal panel 353G for green light, and a transmissive liquid crystal panel 353B for blue light. The configuration of the transmissive liquid crystal panels 353 will be described later in detail.

The light combining system 355 combines the red light modulated by the transmissive light modulator 353R, the green light modulated by the transmissive light modulator 353G, and the blue light modulated by the transmissive light modulator 353B with one another to form image light. The image light formed by the color combining system 355 enters the projection optical apparatus 37. In the present embodiment, the light combining system 355 is formed of a cross dichroic prism having a substantially box-like shape and may instead be formed of a plurality of dichroic mirrors.

The optical part enclosure 36 houses the homogenizing system 32, the color separation system 33, the relay system 34, and the image formation apparatus 35 described above. An optical axis Ax, which is the optical axis in the design stage, is set in the image projection apparatus 3, and the optical part enclosure 36 holds the homogenizing system 32, the color separation system 33, the relay system 34, and the image formation apparatus 35 at predetermined positions along the optical axis Ax. The light source apparatus 31 and the projection optical apparatus 37 are disposed at predetermined positions along the optical axis Ax.

The projection optical apparatus 37 projects the image light incident from the image formation apparatus 35 onto a projection receiving surface, such as a screen. The projection optical apparatus 37 can, for example, be a unit lens including a plurality of lenses that are not shown and a lens barrel 371, which houses the plurality of lenses.

Configuration of Transmissive Liquid Crystal Panels

Figure 2:
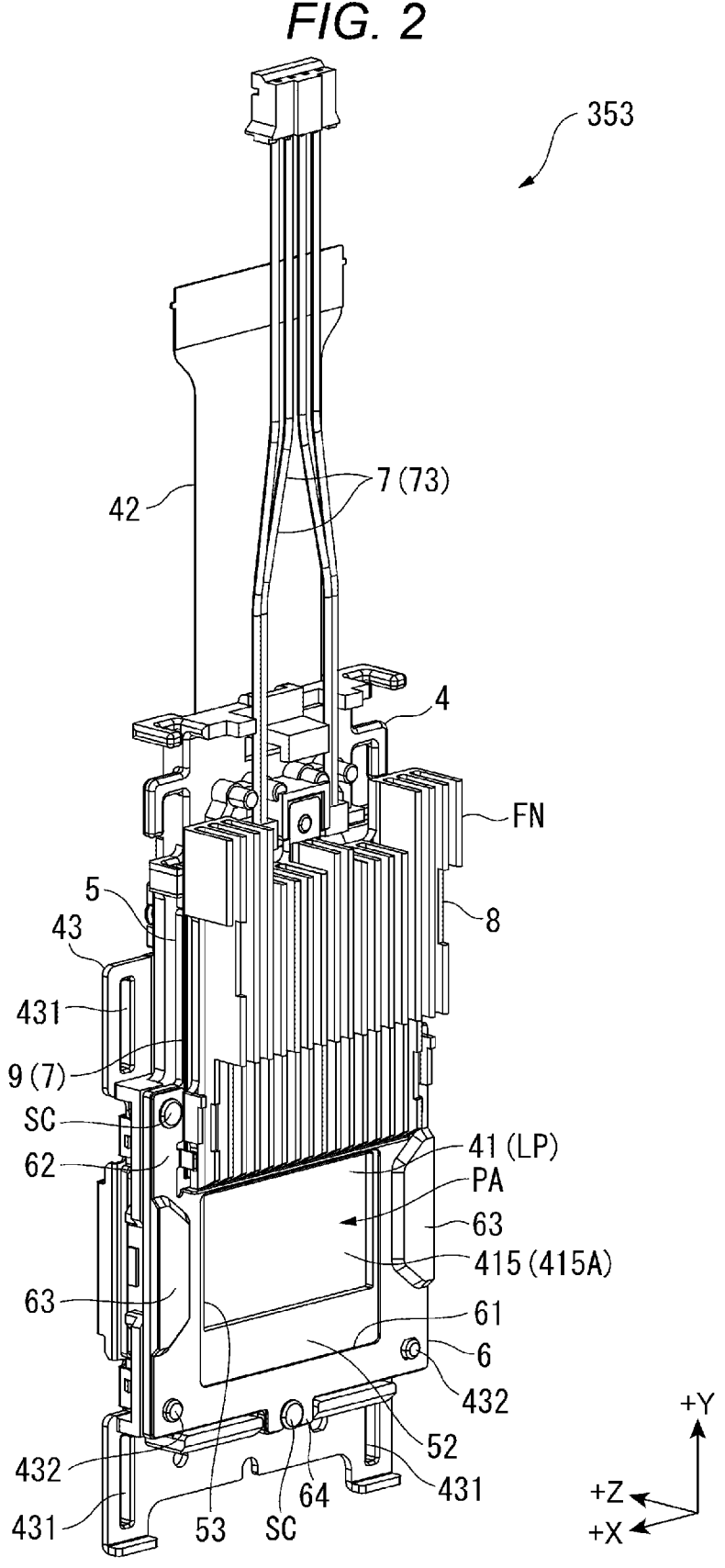
FIG. 2 is a perspective view showing a transmissive liquid crystal panel in the first embodiment.
Figure 3:
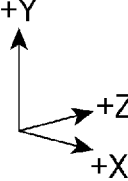
FIG. 3 is a perspective view showing the transmissive liquid crystal panel in the first embodiment.
Figure 4:
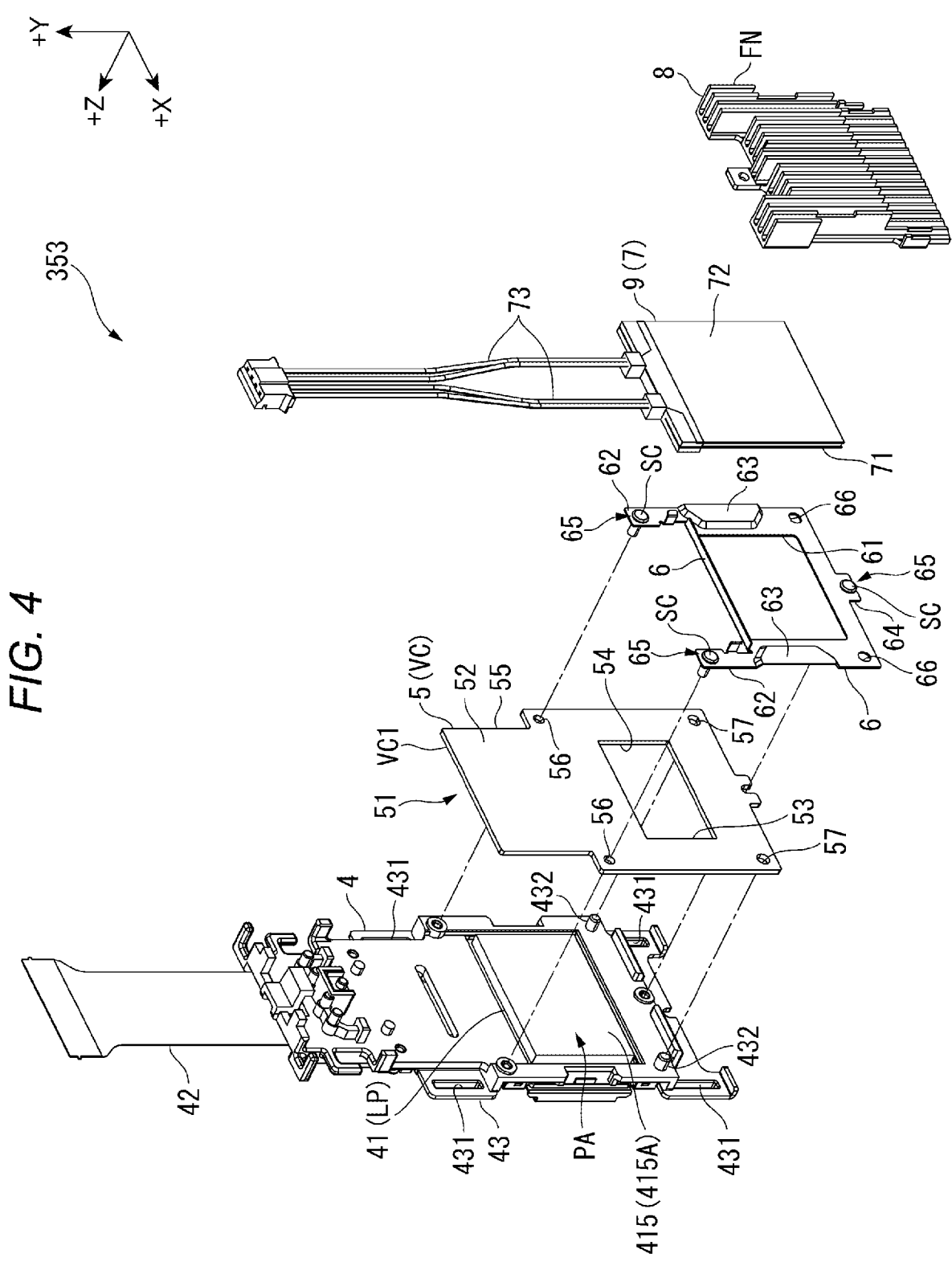
FIG. 4 is an exploded perspective view showing the transmissive liquid crystal panel in the first embodiment.
Figure 5:
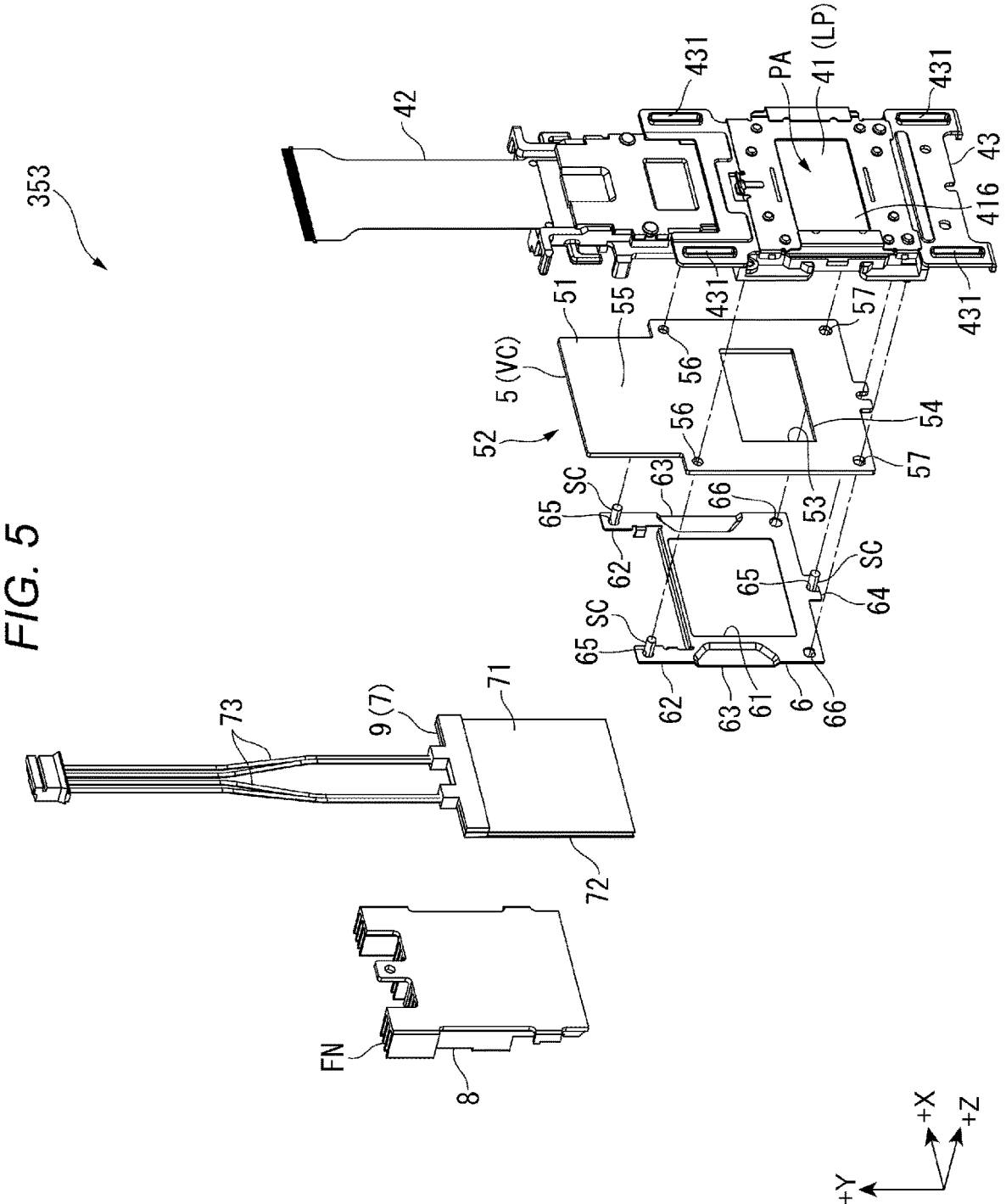
FIG. 5 is an exploded perspective view showing the transmissive liquid crystal panel in the first embodiment.

FIG. 2 is a perspective view showing one of the transmissive liquid crystal panels 353 viewed from the light incident side, and FIG. 3 is a perspective view showing the transmissive liquid crystal panel 353 viewed from the light exiting side. FIG. 4 is an exploded perspective view showing the transmissive liquid crystal panel 353 viewed from the light incident side, and FIG. 5 is an exploded perspective view showing the transmissive liquid crystal panel 353 viewed from the light exiting side.

The transmissive liquid crystal panels 353 correspond to the light transmissive optical element module according to the present disclosure. The transmissive liquid crystal panels 353 each include an optical device 4, a heat diffuser 5, a holding member 6, a thermoelectric conversion device 7, and a cooler 8, as shown in FIGS. 2 to 5. The thermoelectric conversion device 7 is also one of the components of a temperature adjuster 9, which will be described later.

In the following description, three directions perpendicular to one another are called directions +X, +Y, and +Z. In the present embodiment, it is assumed that the direction +Z is the traveling direction of the light to be incident on any of the transmissive liquid crystal panels 353. It is further assumed that the direction +X is the leftward direction when the transmissive liquid crystal panel 353 is viewed along the direction +Z in such a way that the direction +Y coincides with the upward direction. Although not shown, it is assumed that the opposite direction of the direction +X is a direction −X, the opposite direction of the direction +Y is a direction −Y, and the opposite direction of the direction +Z is a direction −Z. That is, the direction +Z with respect to the transmissive liquid crystal panel 353 extends in the space facing the light exiting side of the transmissive liquid crystal panel 353, and the direction −Z with respect to the transmissive liquid crystal panel 353 extends in the space facing the light incident side of the transmissive liquid crystal panel 353.

The axis along the direction +X or −X is called an axis X, the axis along the direction +Y or −Y is called an axis Y, and the axis along the direction +Z or −Z is called an axis Z.

Configuration of Optical Device

Figure 6:
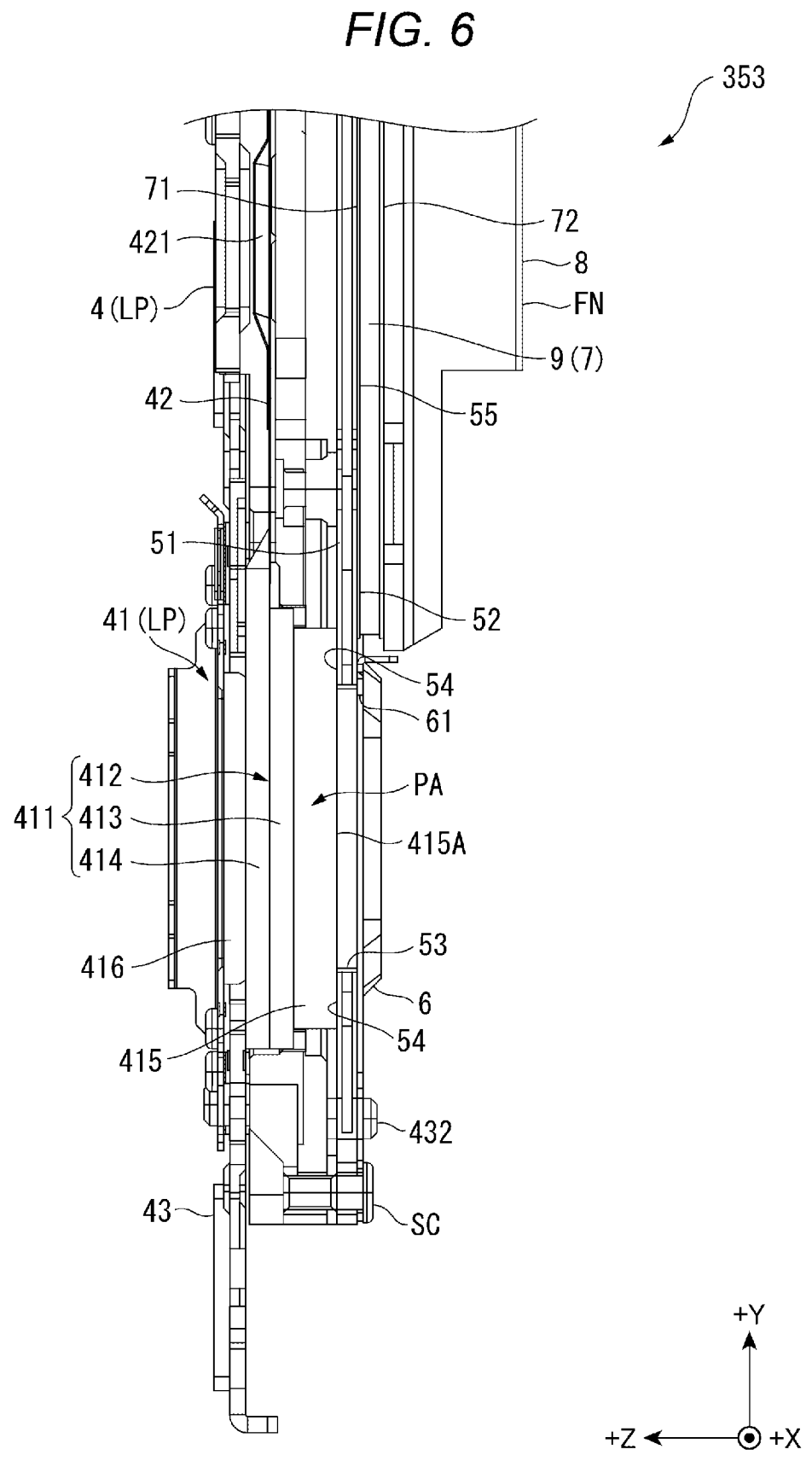

FIG. 6 shows a cross section of the transmissive liquid crystal panel 353 taken along the plane YZ.

The optical device 4 is an apparatus that affects the light incident thereon. The optical device 4 includes a light transmissive optical element 41, a flexible printed circuit (FPC) 42, and a holding frame 43, as shown in FIG. 6. The light transmissive optical element 41 is abbreviated to an optical element 41 in some cases.

The optical element 41 causes the light incident thereon to exit. In detail, the optical element 41 causes the light incident thereon to exit along the traveling direction of the incident light. The optical element 41 is a heat source in the transmissive liquid crystal panel 353. The optical element 41 includes an optically affecting section 411, and a light-incident-side dustproof substrate 415 and a light-exiting-side dustproof substrate 416, which sandwich the optically affecting section 411 in the axis Z.

Configuration of Optically Affecting Section

The optically affecting section 411 includes a liquid crystal layer 412, a counter substrate 413, and a pixel substrate 414, the latter two of which sandwich the liquid crystal layer 412 in the axis Z.

The liquid crystal layer 412 is formed of liquid crystal molecules encapsulated between the counter substrate 413 and the pixel substrate 414.

The counter substrate 413 is disposed on the light incident side of the liquid crystal layer 412. The counter substrate 413 is provided with a counter electrode at the surface facing the liquid crystal layer 412.

The pixel substrate 414 is disposed on the light exiting side of the liquid crystal layer 412. The pixel substrate 414 is provided with a plurality of pixel electrodes at the surface facing the liquid crystal layer 412. When viewed in the direction −Z, which is the direction toward the light incident side, the region of the optically affecting section 411 where the plurality of pixel electrodes are disposed is a pixel region PA, and one pixel is formed by the region of the pixel region PA where one of the pixel electrodes is disposed.

The counter substrate 413 and the pixel substrate 414 are coupled to the FPC 42, and the arrangement of the liquid crystal molecules, which form the liquid crystal layer 412, is changed in accordance with an image signal supplied from the FPC 42. The optically affecting section 411 thus modulates the light incident thereon. That is, the optical device 4 is a liquid crystal panel LP, in which the liquid crystal layer 412 modulates the light incident in the direction +Z and causes the modulated light to exit in the direction +Z.

Configuration of Light-Incident-Side Dustproof Substrate

The light-incident-side dustproof substrate 415 is a light transmissive substrate provided at the light incident surface of the counter substrate 413 at the portion corresponding to the pixel region PA. When the optical device 4 is viewed in the direction −Z, the light-incident-side dustproof substrate 415 is provided so as to cover the pixel region PA and be capable of transferring heat to the light incident surface of the counter substrate 413. The light-incident-side dustproof substrate 415 suppresses adhesion of dust and other foreign matter from the light incident surface of the counter substrate 413 and contamination of the image light with shadows of the dust and other foreign matter.

The heat diffuser 5, which will be described later, is coupled to the light-incident-side dustproof substrate 415. In detail, a light incident surface 415A of the light-incident-side dustproof substrate 415 is in contact with a contact section 54 of the heat diffuser 5 in a heat transferrable manner. The light incident surface 415A is a heat transfer surface that transfers heat generated at the optically affecting section 411 of the optical element 41 to the heat diffuser 5. That is, the optical device 4 includes the light transmissive optical element 41, which causes the light incident thereon to exit, and the light incident surface 415A as the heat transfer surface that transfers heat of the light transmissive optical element 41.

Configuration of Light-Exiting-Side Dustproof Substrate

The light-exiting-side dustproof substrate 416 is a light transmissive substrate provided at the light exiting surface of the pixel substrate 414 at the portion corresponding to the pixel region PA. When the optical device 4 is viewed in the direction +Z, the light-exiting-side dustproof substrate 416 is provided so as to cover the pixel region PA and be capable of transferring heat to the light exiting surface of the pixel substrate 414. The light-exiting-side dustproof substrate 416 suppresses adhesion of dust and other foreign matter from the light exiting surface of the pixel substrate 414 and contamination of the image light with shadows of the dust and other foreign matter.

Configuration of FPC

The FPC 42 extends from the counter substrate 413 and the pixel substrate 414 in the direction +Y and is coupled to the controller described above, as shown in FIG. 6. The FPC 42 includes a driver circuit 421, which drives the optically affecting section 411, and the driver circuit 421 applies a drive signal according to the image signal inputted from the controller to the pixel substrate 414.

Configuration of Holding Frame

The holding frame 43 holds the optical element 41 and the FPC 42, and also supports the heat diffuser 5, the holding member 6, the thermoelectric conversion device 7, and the cooler 8. The holding frame 43 is formed in a rectangular shape elongated in the direction +Y when viewed from the light exiting side, as shown in FIGS. 3 and 5. The holding frame 43 has, although not shown, an opening through which the light entering the optical element 41 and the light exiting out thereof passes. The holding frame 43 has four through ports 431, which pass through the holding frame 43 along the axis Z. Arms of support members that are not shown but are provided in the color combining system 355 are inserted into the four through ports 431. The support member is provided at each of three light incident surfaces of the color combining system 355 on which the red light, the green light, and the blue light modulated by the transmissive liquid crystal panels 353 are incident, and the inserting the arms into the through ports 431 causes the color combining system 355 and the three transmissive liquid crystal panels 353 to be integrated with each other.

Configuration of Heat Diffuser

The heat diffuser 5 receives heat of the optical element 41 via the light incident surface 415A of the light-incident-side dustproof substrate 415 and diffuses the received heat. The heat diffuser 5 is formed substantially in a rectangular shape elongated along the axis Y when viewed in the direction +Z, and is disposed at the light incident side of the optical device 4, as shown in FIGS. 4 and 5. In detail, the heat diffuser 5 is disposed between the optical element 41 and the thermoelectric conversion device 7. The heat diffuser 5 has a first surface 51, a second surface 52, an opening 53, a contact section 54, an extension 55, two holes 56, and two holes 57.

The first surface 51 a surface of the heat diffuser 5 that faces the optical device 4. That is, the first surface 51 is a surface of the heat diffuser 5 that faces the optical element 41. In other words, the first surface 51 is a light-exiting-side surface of the heat diffuser 5.

The second surface 52 is a surface of the heat diffuser 5 that is opposite from the first surface 51. The holding member 6 and the thermoelectric conversion device 7, which will be described later, are in contact with the second surface 52.

The light incident on the optical element 41 passes through the opening 53 in the direction +Z with the heat diffuser 5 attached to the holding frame 43. That is, the opening 53 is a through port passing through the heat diffuser 5 along the direction +Z. The opening 53 is formed substantially in a rectangular shape corresponding to the pixel region PA when viewed from the light incident side.

The contact section 54 is provided at the circumferential edge of the opening 53 of the first surface 51. The contact section 54 is in contact with the light incident surface 415A, which is a heat transfer surface, and receives the heat of the optical element 41 via the light incident surface 415A.

The extension 55 is a portion of the heat diffuser 5 that extends from the contact section 54 in a direction that intersects with the direction in which the light is incidence on the optical element 41. In detail, the extension 55 is a portion extending from the contact section 54 in the direction away from the pixel region PA, which emits the image light, of the optical device 4. Specifically, the extension 55 is a portion extending from the contact section 54 in the direction +Y, which intersects with the axis Z. In the heat diffuser 5, the heat of the optical element 41 received by the contact section 54 diffuses into the extension 55. The heat diffused into the extension 55 is then absorbed by the thermoelectric conversion device 7 provided at the second surface 52.

The two holes 56 are provided away from the opening 53 in the direction +Y. Screws SC, which are threaded into the holding frame 43, are inserted into the two holes 56.

The two holes 57 are provided away from the opening 53 in the direction −Y. Protrusions 432 provided at the holding frame 43 are inserted into the two holes 57, as shown in FIG. 4. That is, the protrusions 432 are positioning protrusions, and the two holes 57 are positioning holes.

In the present embodiment, the heat diffuser 5 is a vapor chamber VC including a sealed enclosure VC1, which encapsulates a working fluid changeable between gas and liquid phases.

The first surface 51 is a surface of the sealed enclosure VC1 that faces the optical element 41, and the second surface 52 is a surface of the sealed enclosure VC1 that is opposite from the first surface 51. The contact section 54 and the extension 55 are provided as portions of the sealed enclosure VC1, and the contact section 54 is a heat receiver of the sealed enclosure VC1 that receives the heat of the optical element 41.

Part of the working fluid in the liquid phase encapsulated in the sealed enclosure VC1 is vaporized by the heat of the optical element 41 received by the contact section 54 and changed into the working fluid in the gas phase, which diffuses in the sealed enclosure VC1.

Part of the gas-phase working fluid transfers the heat to lower-temperature portions of the sealed enclosure VC1. The gas-phase working fluid thus condenses and changes into the liquid-phase working fluid. The working fluid having changed into the liquid phase is moved back to the heat receiver via the inner surface of the sealed enclosure VC1.

The portion of the sealed enclosure VC1 to which the heat is transferred is a heat dissipation portion, and the transferred heat is dissipated via the heat dissipation portion. Since the thermoelectric conversion device 7 is provided at the second surface 52, particularly, at the extension 55, the portion of the sealed enclosure VC1 where the thermoelectric conversion device 7 is provided forms the heat dissipating portion.

Configuration of Holding Member

The holding member 6 is formed in the shape of a substantially rectangular frame, as shown in FIGS. 4 and 5. The holding member 6 is fixed to the holding frame 43 with the screws SC and holds the light-incident-side polarizer 352 shown in FIG. 1 at the light incident side of the optical element 41. The holding member 6 has an opening 61, two arms 62, two fixing sections 63, a protrusion 64, three holes 65, and two holes 66.

The opening 61 is a rectangular opening and is provided at a position corresponding to the pixel region PA when the holding member 6 is fixed to the holding frame 43. The light having exited out of the light-incident-side polarizer 352 in the direction +Z passes through the opening 61 and further passes through the opening 53 of heat diffuser 5, and enters the optical element 41.

One of the two arms 62 protrudes in the direction +Y from an end portion of the holding member 6 that faces the positive end of the direction X, and the other arm 62 protrudes in the direction +Y from an end portion of the holding member 6 that faces the negative end of the direction X.

One of the two fixing sections 63 is provided away from the opening 61 in the direction +X, and the other fixing section 63 is provided away from the opening 61 in the direction −X. The fixing sections 63 protrude in the direction −Z, and fix the light-incident-side polarizer 352 at the light incident side of the holding member 6, for example, with an adhesive.

The protrusion 64 protrudes in the direction −Y from the center, along the axis X, of the holding member 6.

Two of the three holes 65 are provided in the two arms 62, and the remaining one hole 65 is provided in the protrusion 64. The screws SC, which are fixed to the holding frame 43, are inserted into the holes 65 along the direction +Z.

The two holes 66 are provided at the corners of the opening 61 that face the negative end of the direction Y. The protrusions 432, which are provided at the holding frame 43 and serve as the positioning protrusions, are inserted into the two holes 66. That is, the two holes 66 are positioning holes.

The holding member 6 is fixed along with the heat diffuser 5 to the holding frame 43 and holds the light-incident-side polarizer 352, as described above.

Configuration of Thermoelectric Conversion Device

The thermoelectric conversion device 7 is coupled to the heat diffuser 5 and absorbs the heat from the heat diffuser 5 and dissipates the absorbed heat. The thermoelectric conversion device 7 has a first surface 71, a second surface 72, and lead wires 73, as shown in FIGS. 4 and 5.

The first surface 71 is a surface of the thermoelectric conversion device 7 that faces the heat diffuser 5. In detail, the first surface 71 is a surface of the thermoelectric conversion device 7 that is in contact with the extension 55. In other words, the first surface 71 is a surface of the thermoelectric conversion device 7 that faces the positive end of the direction Z.

The second surface 72 is a surface of the thermoelectric conversion device 7 that is opposite from the first surface 71. In other words, the second surface 72 is a surface of the thermoelectric conversion device 7 that faces the negative end of the direction Z. The cooler 8 is in contact with the second surface 72.

The lead wires 73 extend in the direction +Y from the end of thermoelectric conversion device 7 that faces the positive end of the direction Y. The lead wires 73 are coupled to a control section 92 of the temperature adjuster 9, which will be described later. That is, the operation of the thermoelectric conversion device 7 is controlled by the control section 92.

The thus configured thermoelectric conversion device 7 actively absorbs the heat transferred from the extension 55 via the first surface 71 with the aid of electric power supplied along the lead wires 73, and dissipates the absorbed heat to the cooler 8 via the second surface 72.

In the present embodiment, the thermoelectric conversion device 7 is a Peltier device. Reversing the polarity of the thermoelectric conversion device 7 therefore allows the heat to be supplied to the extension 55 via the first surface 71. That is, the thermoelectric conversion device 7 can heat the optical element 41 of the optical device 4 via the heat diffuser 5. At this point in the heat diffuser 5, the heat supplied from the thermoelectric conversion device 7 changes the liquid-phase working fluid in the vicinity of the extension 55 into the gas-phase working fluid, which diffuses in the sealed enclosure VC1. Part of the gas-phase working fluid transfers the heat to the contact section 54, which supplies the heat to the optical element 41. When the heat is supplied to the heat diffuser 5 via the first surface 71, the second surface 72 serves as a heat absorbing surface and absorbs the heat from the cooler 8. The cooler 8 is coupled to thermoelectric conversion device 7, but is not coupled to the heat diffuser 5 or the optical device 4. Since the thermoelectric conversion device 7 serves as an insulating member, the cooling effect provided by the thermoelectric conversion device 7 does not act on the optical element 41 when the thermoelectric conversion device 7 heats the optical element 41.

Configuration of Cooler

Figure 7:
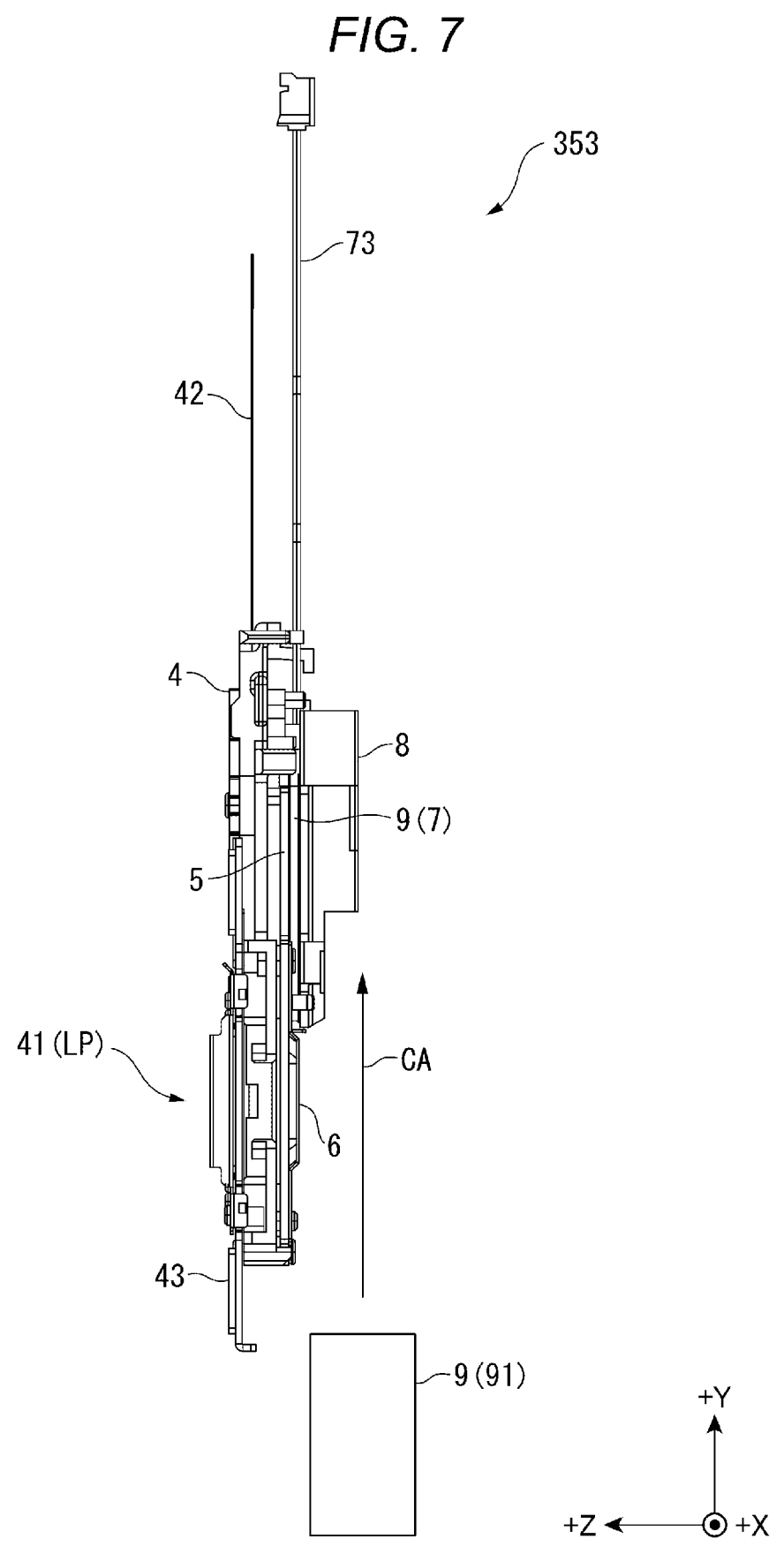

FIG. 7 is a side view showing one of the transmissive liquid crystal panels 353 and a driver 91 viewed in the direction +X.

The cooler 8 is coupled to the second surface 72 of the thermoelectric conversion device 7 and dissipates the heat transferred from the thermoelectric conversion device 7. In the present embodiment, the cooler 8 is a heat sink with a plurality of fins FN, as shown in FIGS. 2 and 4. The cooler 8 transfers the heat of the optical element 41 transferred from the thermoelectric conversion device 7 to a cooling gas CA caused to flow by the driver 91 of the temperature adjuster 9, which will be described later, to dissipate the heat of the optical element 41, as shown in FIG. 7.

Other Configurations of Transmissive Liquid Crystal Panels

Figure 8:
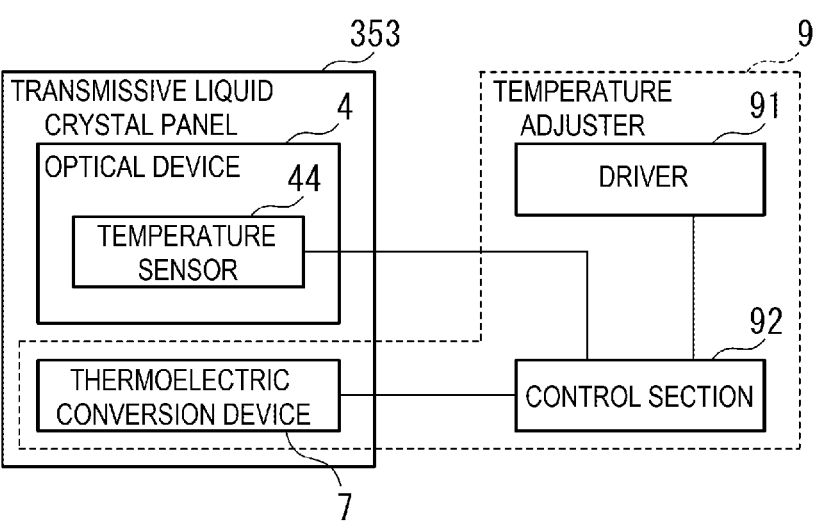
FIG. 8 is a block diagram showing other configurations of the transmissive liquid crystal panel and the configuration of a temperature adjuster in the first embodiment.

FIG. 8 is a block diagram showing other configurations of the transmissive liquid crystal panel 353 and the configuration of the temperature adjuster 9.

In addition to the configuration described above, the transmissive liquid crystal panels 353 each include a temperature sensor 44, as shown in FIG. 8. In detail, the optical device 4 includes the temperature sensor 44.

The temperature sensor 44 is provided, for example, at the holding frame 43 and detects the temperature of the optical element 41. The temperature sensor 44 outputs the result of the detection to the control section 92 of the temperature adjuster 9.

Configuration of Temperature Adjuster

In addition to the configuration described above, the projector 1 includes the temperature adjuster 9, which adjusts the temperature of the transmissive liquid crystal panels 353. The temperature adjuster 9 includes the thermoelectric conversion device 7 as well as the driver 91 and the control section 92, as shown in FIG. 8. That is, the thermoelectric conversion device 7 constitutes the transmissive liquid crystal panel 353, further constitutes the temperature adjuster 9, and adjusts the temperature of the optical element 41 under control performed by the control section 92.

The driver 91 cools the cooler 8. In the present embodiment, the driver 91 is formed of a cooling fan that causes the cooling gas to flow to the cooler 8, as shown in FIG. 7. The operation of the driver 91 is controlled by the control section 92.

The control section 92 controls the operation of the driver 91 and the thermoelectric conversion device 7 to adjust the temperature of the optical element 41 of the optical device 4. In detail, the control section 92 controls the operation of the driver 91 and the thermoelectric conversion device 7 based on the temperature of the optical element 41 detected by the temperature sensor 44.

For example, when the detected temperature of the optical element 41 exceeds the upper limit of a predetermined suitable temperature range, the control section 92 carries out the process of cooling the optical element 41. The cooling process includes at least one of increasing the flow rate of the cooling gas as the output of the driver 91 increases, and increasing the amount of heat absorbed by the thermoelectric conversion device 7 as the output of the thermoelectric conversion device 7 increases.

For example, when the detected temperature of the optical element 41 is smaller than the lower limit of the predetermined suitable temperature range, the control section 92 carries out the process of heating the optical element 41. The heating process includes at least one of reducing the flow rate of the cooling gas and the heating operation performed by the thermoelectric conversion device 7 as the output of the driver 91 decreases. The heating operation performed by the thermoelectric conversion device 7 includes at least one of reducing the amount of heat absorbed by the thermoelectric conversion device 7 and heating the optical element 41 performed by the thermoelectric conversion device 7 as the output of the thermoelectric conversion device 7 decreases. Heating the optical element 41 performed by the thermoelectric conversion device 7 is specifically performed by the heat diffuser 5 through transfer of the heat supplied by the thermoelectric conversion device 7 to the optical element 41, which is a liquid crystal panel, via the contact section 54.

As described above, the temperature of the transmissive liquid crystal panel 353 is maintained within the suitable temperature range described above by the control section 92 through the control of the operation of the driver 91 and the thermoelectric conversion device 7.

Effects of First Embodiment

The projector 1 according to the present embodiment described above provides the following effects.

The projector 1, which is the electronic instrument, includes the transmissive liquid crystal panels 353. The transmissive liquid crystal panels 353 correspond to the light transmissive optical element module.

The transmissive liquid crystal panels 353 each include the optical device 4, the heat diffuser 5, the thermoelectric conversion device 7, and the cooler 8.

The optical device 4 includes the light transmissive optical element 41, which causes light incident thereon to exit, and the light incident surface 415A as a transfer surface via which the heat of the optical element 41 is transferred.

The heat diffuser 5 includes the contact section 54, which is in contact with the light incident surface 415A, and the extension 55, which extends from the contact section 54. The heat diffuser 5 diffuses the received heat.

The thermoelectric conversion device 7 has the first surface 71, which is in contact with the extension 55, and the second surface 72, which is disposed at the side opposite from the first surface 71. The thermoelectric conversion device 7 absorbs the heat transferred from the extension 55 via the first surface 71 and dissipates the absorbed heat via the second surface 72.

The cooler 8 is in contact with the second surface 72.

According to the configuration described above, the heat generated at the light transmission optical element 41 is diffused from the contact section 54 of the heat diffuser 5, which is in contact with the light incident surface 415A, to the extension 55, and is transferred from the extension 55 to the first surface 71 of the thermoelectric conversion device 7. The thermoelectric conversion device 7 dissipates via the cooler 8, which is in contact with the second surface 72, the heat transferred from the extension 55 to the first surface 71. The heat dissipation area over which the heat of the optical element 41 is dissipated can thus be expanded, whereby the efficiency at which the heat of the optical element 41 is dissipated can be improved. Since the thermoelectric conversion device 7 facilitates the heat transfer from the first surface 71 to the second surface 72, the heat transfer from the optical element 41 to the cooler 8 can be facilitated, and the efficiency at which the cooler 8 dissipates the heat of the optical element 41 can in turn be increased. The optical element 41 can therefore be cooled at increased efficiency.

The heat diffuser 5 is the vapor chamber VC including the sealed enclosure VC1, which houses the working fluid that changes between the gas phase and the liquid phase. The contact section 54 and the extension 55 are provided in the sealed enclosure VC1.

According to the configuration described above, when the vapor chamber VC, which is the heat diffuser 5, receives at the contact section 54 the heat of the optical element 41 via the light incident surface 415A, the liquid-phase working fluid changes to the gas-phase working fluid at the contact section 54 and diffuses in the sealed enclosure VC1. The heat of the optical element 41 thus diffuses in the sealed enclosure VC1, which includes the extension 55, and the gas-phase working fluid condenses and changes into the liquid-phase working fluid when the heat is transferred into the sealed enclosure VC1. The condensation of the liquid-phase working fluid occurs at lower-temperature portions of the sealed enclosure VC1. The thermoelectric conversion device 7 thus absorbs the heat via the first surface 71, so that the heat of the gas-phase working fluid is actively transferred to the extension 55, which is in contact with the first surface 71, and the gas-phase working fluid condenses at the same time. The working fluid having changed from the gas phase to the liquid phase moves in the sealed enclosure VC1 and reaches the contact section 54. The heat absorbed from the extension 55 by the thermoelectric conversion device 7 is transferred to the cooler 8 via the second surface 72 and dissipated by the cooler 8, as described above.

Employing the vapor chamber VC as the heat diffuser 5 thus allows the cooler 8 to quickly dissipate the heat of the optical element 41. The optical element 41 can therefore be cooled at increased efficiency.

The cooler 8 is a heat sink.

According to the configuration described above, which is a relatively simple configuration in which the cooler 8, which dissipates the heat of the optical element 41 transferred from the thermoelectric conversion device 7, is a heat sink, the heat dissipation area can be expanded. Therefore, the manufacturing cost of the transmissive liquid crystal panels 353 as the light transmissive optical element module can be reduced, and the size of the transmissive liquid crystal panels 353 can also be reduced.

The thermoelectric conversion device 7 is a Peltier device.

According to the configuration described above, in which the thermoelectric conversion device 7 is a Peltier device, the heat can be actively absorbed from the extension 55 of the heat diffuser 5, and the heat of the optical element 41 can in turn be efficiently dissipated to the cooler 8. The optical element 41 can therefore be cooled at increased efficiency.

The light transmissive optical element 41 is a liquid crystal panel that includes the liquid crystal layer 412, which modulates light incident thereon in the direction +Z, and causes the modulated light to exit in the direction +Z. The direction +Z corresponds to the first direction according to the present disclosure. The heat diffuser 5 transfers the heat supplied from the thermoelectric conversion device 7, which is a Peltier device, to the optical element 41, which is a liquid crystal panel, via the contact section 54.

When the temperature of the liquid crystal layer 412 is low, the response of the liquid crystal molecules may decrease, and an image to be formed is likely to deteriorate. In particular, to form images at a high frame rate, the image formation may not be able to keep up with the frame rate, and the images according to the image signal inputted to the optical element 41 may not be formed.

In such a case, the thermoelectric conversion device 7, which is a Peltier device, can heat the optical element 41, which is a liquid crystal panel, via the heat diffuser 5 to increase the temperature of the liquid crystal layer 412. A decrease in the response of the liquid crystal molecules can therefore be suppressed.

On the other hand, when the temperature of the liquid crystal layer 412 is high, the liquid crystal molecules tend to deteriorate, and the life of the optical element 41 tends to shorten. In contrast, the thermoelectric conversion device 7 actively absorbs the heat of the optical element 41 via the heat diffuser 5 to facilitate the dissipation of the heat of the optical element 41 to the cooler 8.

Second Embodiment

A second embodiment of the present disclosure will next be described.

The projector according to the present embodiment has the same configuration as that of the projector 1 according to the first embodiment but differs therefrom in terms of the configuration of the cooler provided in each of the transmissive liquid crystal panels and the configuration of the temperature adjuster. In the following description, portions that are the same or substantially the same as the portions having been already described have the same reference characters and will not be described.

Configuration of Projector

Figure 9:
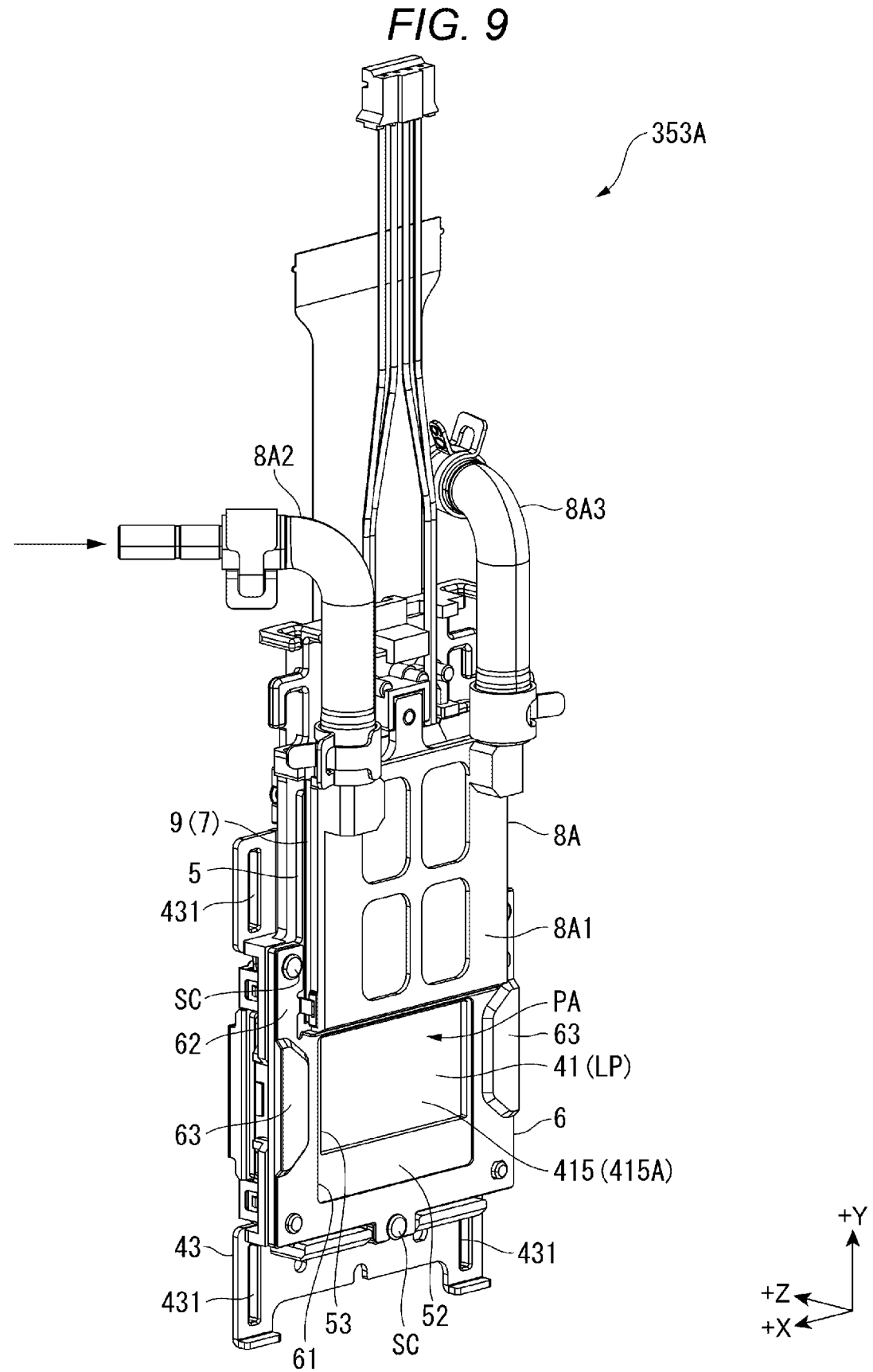
FIG. 9 is a perspective view of the transmissive liquid crystal panel provided in the projector in a second embodiment.
Figure 10:
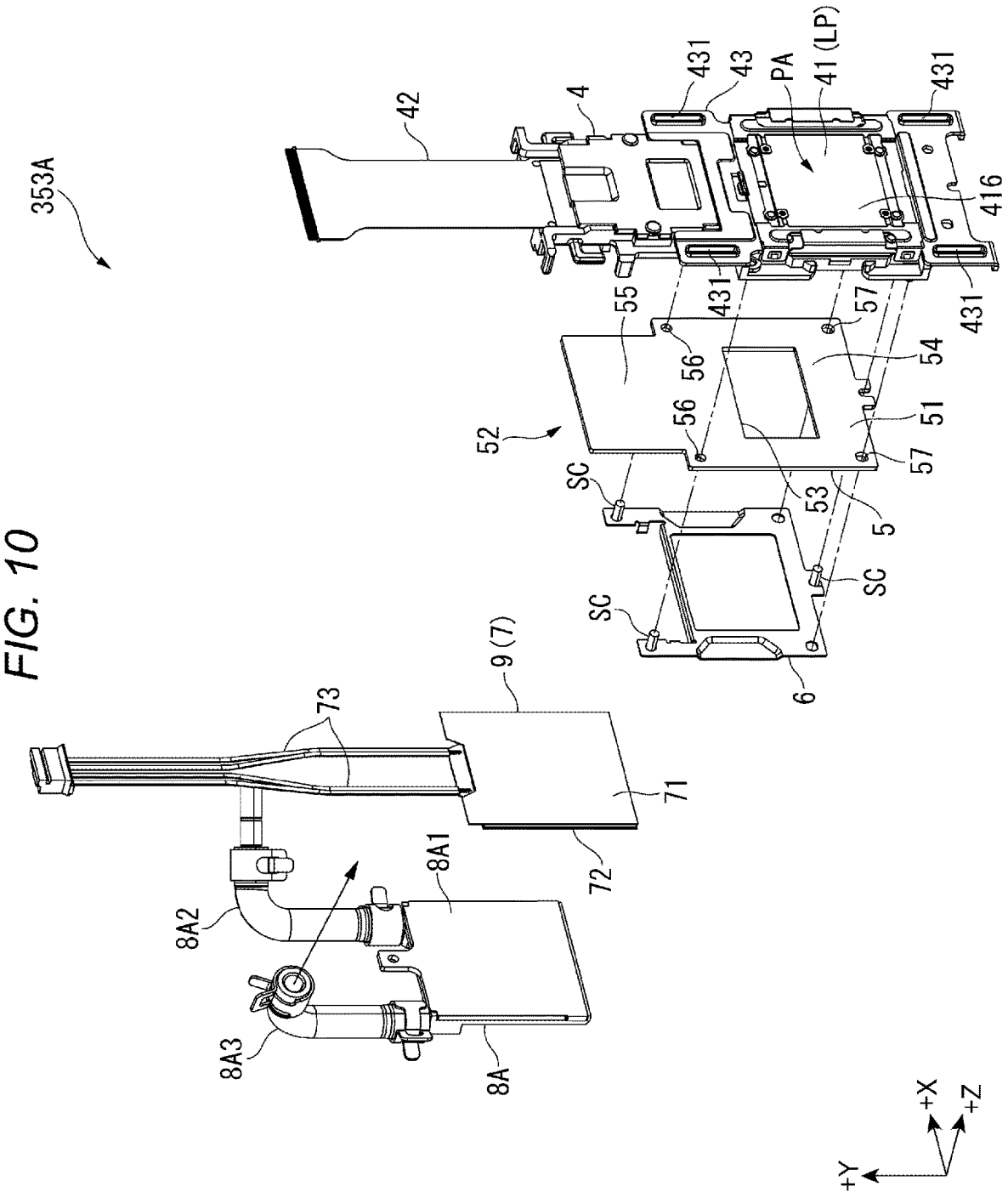
FIG. 10 is an exploded perspective view showing the transmissive liquid crystal panel in the second embodiment.
Figure 11:
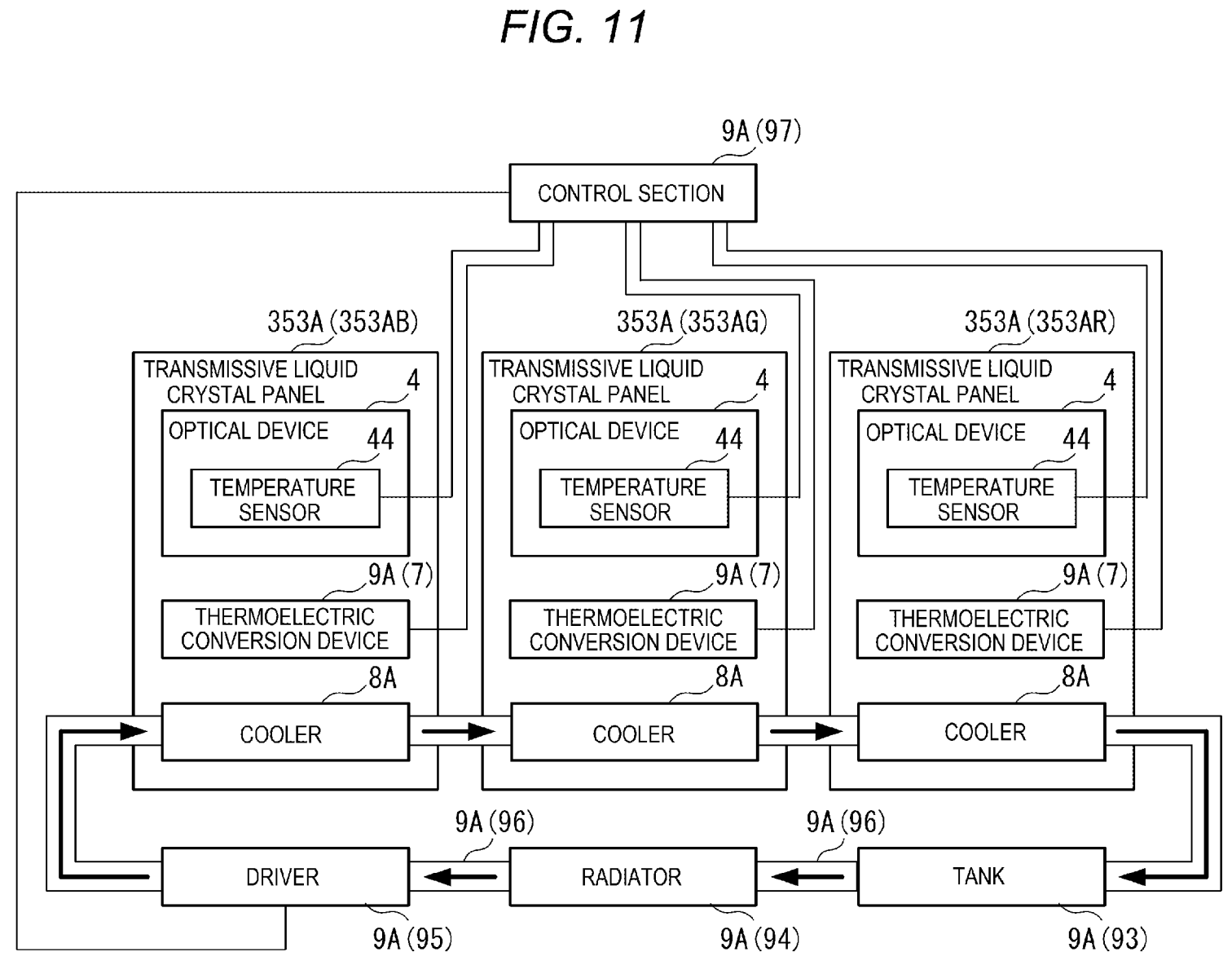

FIG. 9 is a perspective view of each transmissive liquid crystal panel 353A provided in the projector according to the present embodiment viewed from the light incident side. FIG. 10 is an exploded perspective view showing the transmissive liquid crystal panel 353A viewed from the light exiting side. FIG. 11 is a block diagram showing the configuration of a temperature adjuster 9A provided in the projector according to the present embodiment.

The projector according to the present embodiment has the same configuration and functions as those of the projector 1 according to the first embodiment except that the transmissive liquid crystal panels 353 are replaced with the transmissive liquid crystal panels 353A shown in FIGS. 9 and 10 and the temperature adjuster 9 is replaced with the temperature adjuster 9A shown in FIG. 11.

Configuration of Transmissive Liquid Crystal Panels

The transmissive liquid crystal panels 353A each have the same configuration as that of each of the transmissive liquid crystal panels 353 in the first embodiment except that the cooler 8 is replaced with the cooler 8A, as shown in FIGS. 9 and 10. That is, the transmissive liquid crystal panels 353A each include the optical device 4, the heat diffuser 5, the holding member 6, the thermoelectric conversion device 7, and the cooler 8A.

The cooler 8A is coupled to the second surface 72 of the thermoelectric conversion device 7 and dissipates the heat transferred from the thermoelectric conversion device 7, as the cooler 8 according to the first embodiment. The cooler 8A includes a cooler body 8A1, an inflow tube 8A2, and an outflow tube 8A3.

The cooler body 8A1 houses, although not shown in detail, a plurality of channels through which a liquid refrigerant can flow, and the liquid refrigerant supplied via the inflow tube 8A2 flows through the channels. That is, the cooler 8A is a cold plate in which the liquid refrigerant flows.

The cooler body 8A1 is made of metal or any other material having high thermal conductivity and is fixed to the second surface 72 in a heat transferable manner. The heat transferred to the cooler body 8A1 via the second surface 72 is transferred to the liquid refrigerant flowing in the cooler body 8A1. The cooler body 8A1 is thus cooled, and the optical element 41 is in turn cooled.

The inflow tube 8A2 is a tubular member that causes the liquid refrigerant to flow into the cooler body 8A1.

The outflow tube 8A3 is a tubular member out of which the liquid refrigerant having flowed in the cooler body 8A1 flows.

The liquid refrigerant is caused to flow to the cooler 8A by the temperature adjuster 9A.

The projector according to the present embodiment includes three transmissive liquid crystal panels 353A, as the projector 1 according to the first embodiment does. The three transmissive liquid crystal panels 353A include a transmissive liquid crystal panel 353AR for red light, a transmissive liquid crystal panel 353AG for green light, and a transmissive liquid crystal panel 353AB for blue light, as shown in FIG. 11.

In the example shown in FIG. 11, the inflow tube 8A2 of the transmissive liquid crystal panel 353AB for blue light is coupled to a driver 95, which will be described later, and the outflow tube 8A3 of the transmissive liquid crystal panel 353AB is coupled to the inflow tube 8A2 of the transmissive liquid crystal panel 353AG for green light. The outflow tube 8A3 of the transmissive liquid crystal panel 353AG is coupled to the inflow tube 8A2 of the transmissive liquid crystal panel 353AR for red light, and the outflow tube 8A3 of the transmissive liquid crystal panel 353AR is coupled to a tank 93, which will be described later.

Configuration of Temperature Adjuster

The temperature adjuster 9A adjusts the temperatures of the transmissive liquid crystal panels 353A, as the temperature adjuster 9 according to the first embodiment does. The temperature adjuster 9A includes the tank 93, a radiator 94, the driver 95, tubular members 96, and a control section 97, as shown in FIG. 11. Out of the components described above, the tubular members 96 are formed to allow the liquid refrigerant to flow therein.

The tank 93 stores the liquid refrigerant.

The radiator 94 is coupled to the tank 93 via a tubular member 96. The radiator 94 cools the liquid refrigerant flowing from the tank 93.

The driver 95 is coupled to the radiator 94 via a tubular member 96. The driver 95 is a pump and pumps the liquid refrigerant cooled by the radiator 94 to the inflow tube 8A2 of the transmissive liquid crystal panel 353AB. The liquid refrigerant pumped by driver 95 sequentially flows through the cooler 8A of the transmissive liquid crystal panel 353AB, the cooler 8A of the transmissive liquid crystal panel 353AG, and the cooler 8A of the transmissive liquid crystal panel 353AR and further flows into the tank 93. The liquid refrigerant having flowed into the tank 93 flows back into the driver 95 via the radiator 94.

Based on the results of the detection performed by the temperature sensors 44 of the transmissive liquid crystal panels 353AB, 353AG, and 353AR, the control section 97 controls the thermoelectric conversion devices 7 of the transmissive liquid crystal panels 353AB, 353AG, and 353AR and the driver 95 to adjust the temperatures of the optical elements 41 of the transmissive liquid crystal panels 353AB, 353AG, and 353AR.

For example, when the temperature of at least one of the three optical elements 41 exceeds the upper limit of the predetermined suitable temperature range, the control section 97 carries out the process of cooling the optical element 41. The cooling process includes at least one of increasing the flow rate of the liquid refrigerant as the output of the driver 95 increases, and increasing the amount of heat absorbed by the thermoelectric conversion device 7 as the output of the thermoelectric conversion device 7 increases.

For example, when the temperature of at least one of the three optical elements 41 is lower than the lower limit of the predetermined suitable temperature range, the control section 97 carries out the process of heating the optical element 41. The heating process includes at least one of reducing the flow rate of the liquid refrigerant and the heating operation performed by the thermoelectric conversion device 7 as the output of the driver 95 decreases. The heating operation performed by the thermoelectric conversion device 7 includes at least one of reducing the amount of heat absorbed by the thermoelectric conversion device 7 and heating the heat diffuser 5 and in turn the optical element 41 performed by the thermoelectric conversion device 7 as the output of the thermoelectric conversion device 7 decreases. The heating operation performed by the thermoelectric conversion device 7 may be performed by the thermoelectric conversion device 7 corresponding to an optical element 41 determined to have a temperature lower than the lower limit of the suitable temperature range, and may not be performed by the thermoelectric conversion device 7 corresponding to an optical element 41 determined not to have a temperature lower than the lower limit of the suitable temperature range.

In the configuration described above, it is assumed that the three transmissive liquid crystal panels 353A are so coupled to each other that the liquid refrigerant sequentially flows to the transmissive liquid crystal panels 353AB, 353AG, and 353AR, but not necessarily. The order in accordance with which the liquid refrigerant flows to the three transmissive liquid crystal panels 353A is not limited to the order described above.

On the other hand, the transmissive liquid crystal panel 353AB, on which the blue light, which has wavelengths close to those of ultraviolet light, is incident on the panel is incident, is most likely to deteriorate due to the high-energy light. Furthermore, in general, white light preferably used for image formation tends to cause temperature induced deterioration because the amount of the green light is greater than the amount of the other color light. In view of the fact described above, causing the liquid refrigerant having the lowest temperature to flow to the transmissive liquid crystal panel 353AB and causing the liquid refrigerant having flowed to the transmissive liquid crystal panel 353AB to flow to the transmissive liquid crystal panel 353AG before the transmissive liquid crystal panel 353AR allows the transmissive liquid crystal panels 353A to be effectively cooled, whereby the deterioration of the transmissive liquid crystal panels 353A can be suppressed.

It is assumed that the temperature adjuster 9A described above includes one driver 95, which causes the liquid refrigerant to flow to the three transmissive liquid crystal panels 353A. That is, it is assumed that the temperature adjuster 9 has the liquid refrigerant circulating channel including the three transmissive liquid crystal panels 353A and one driver 95, but not necessarily. The temperature adjuster 9A may have a liquid refrigerant circulating channel including one transmissive liquid crystal panel 353A and one driver 95. In other words, the temperature adjuster 9A may include one driver 95 corresponding to one transmissive liquid crystal panel 353A in a one-to-one relationship.

For example, at least one of the three transmissive liquid crystal panels may be a transmissive liquid crystal panel 353A including the cooler 8A, to which the liquid refrigerant is caused to flow by the driver 95, while the other transmissive liquid crystal panels may each be a transmissive liquid crystal panel 353 including the cooler 8, to which the cooling gas is caused to flow by the driver 91 according to the first embodiment. In this case, a control section provided in a temperature adjuster may control the operation of the drivers 91 and 95, or a temperature controller may include the control sections 92 and 97.

Effects of Second Embodiment

The projector according to the present embodiment described above provides the effects below as well as the same effects provided by the projector 1 according to the first embodiment.

In each of the transmissive liquid crystal panels 353A, which correspond to the light transmissive optical element module, the cooler 8A is a cold plate in which the liquid refrigerant flows.

According to the configuration described above, the heat transferred from the thermoelectric conversion device 7 can be transferred to the liquid refrigerant flowing in the cooler 8A. Causing the liquid refrigerant sufficiently to flow to the cooler 8A therefore allows the optical element 41 to be quickly cooled through the combination of the heat diffusion performed by the heat diffuser 5 and the heat absorption performed by the thermoelectric conversion device 7. The optical element 41 can therefore be cooled at increased efficiency.

The light transmissive optical element 41 is a liquid crystal panel that includes the liquid crystal layer 412, which modulates light incident thereon in the direction +Z, and causes the modulated light to exit in the direction +Z. The direction +Z corresponds to the first direction. The heat diffuser 5 transfers the heat supplied from the thermoelectric conversion device 7, which is a Peltier device, to the optical element 41, which is a liquid crystal panel, via the contact section 54.

As described above, the thermoelectric conversion device 7, which is a Peltier device, can heat the optical element 41, which is a liquid crystal panel, via the heat diffuser 5 to increase the temperature of the liquid crystal layer 412. A decrease in the response of the liquid crystal molecules can therefore be suppressed.

On the other hand, when the temperature of the liquid crystal layer 412 is high, the liquid crystal molecules tend to deteriorate, and the life of the optical element 41 tends to shorten. In contrast, the thermoelectric conversion device 7 actively absorbs the heat of the optical element 41 via the heat diffuser 5 to facilitate the dissipation of the heat of the optical element 41 to the cooler 8A.

When the liquid refrigerant in direct or indirect contact with the optical element 41 is heated to heat the optical element 41, which is a liquid crystal panel, it is difficult to quickly adjust the temperature of the liquid crystal molecules because of the high specific heat of the liquid refrigerant. In contrast, the thermoelectric conversion device 7 disposed between the heat diffuser 5 and the cooler 8A is a Peltier device, and the thermoelectric conversion device 7 absorbs the heat from the heat diffuser 5 or heats the heat diffuser 5, whereby the temperature of the optical element 41 can be quickly adjusted. The temperature of the liquid crystal molecules can thus be quickly adjusted, whereby deterioration of an image to be formed can be suppressed.

Variations of Embodiments

The present disclosure is not limited to the embodiments described above, and variations, improvements, and other modifications to the extent that the advantage of the present disclosure is achieved fall within the scope of the present disclosure.

Figure 12:
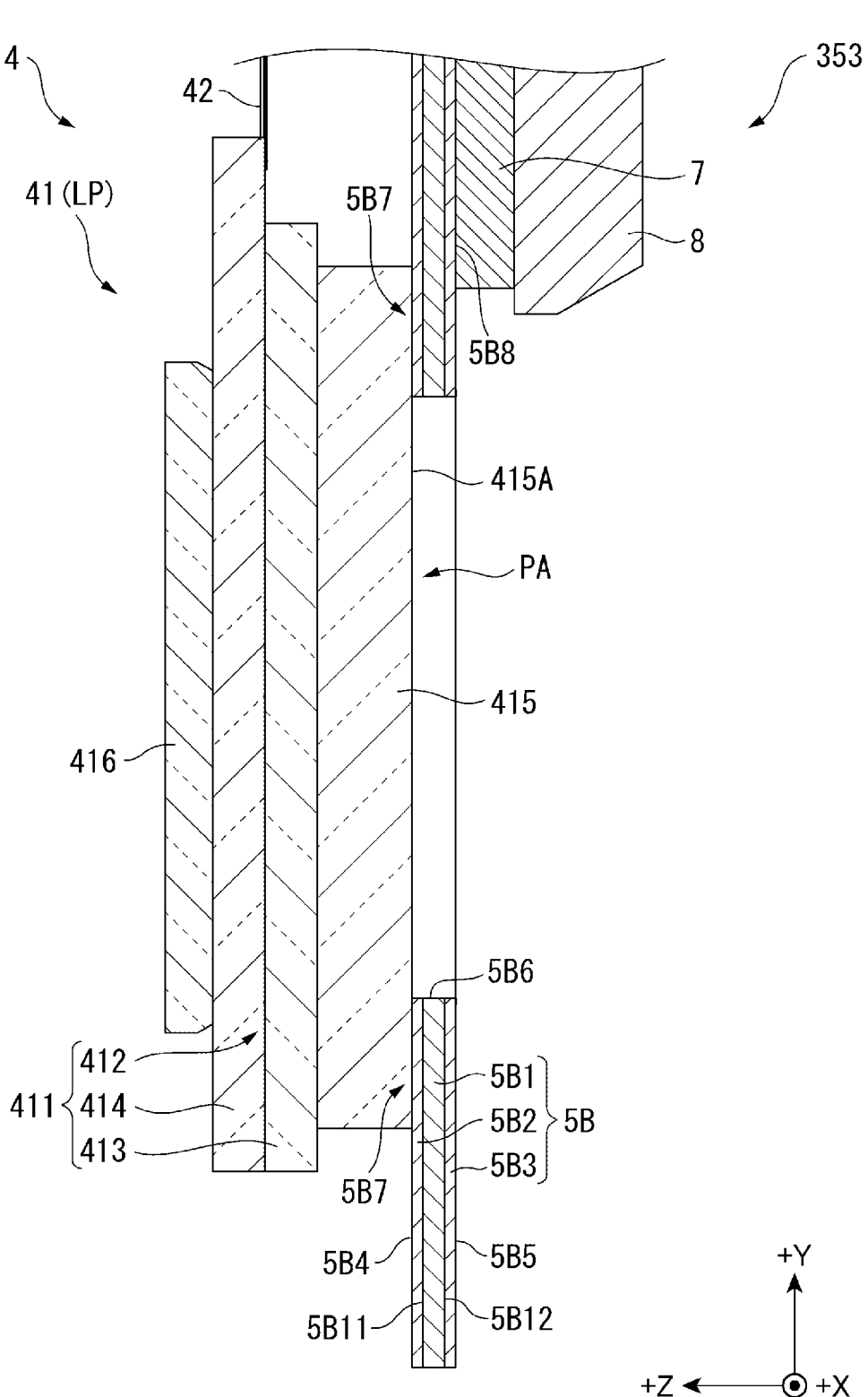
FIG. 12 is a cross-sectional view showing a variation of a heat diffuser in first and second variations.

FIG. 12 is an enlarged cross-sectional view of a portion of any of the transmissive liquid crystal panels 353 including a heat diffuser 5B, which is a variation of the heat diffuser 5, in place of the heat diffuser 5. In FIG. 12, the holding frame 43 and the holding member 6 are omitted.

In each of the embodiments described above, it is assumed that the heat diffuser 5 is formed of the vapor chamber VC including the sealed enclosure VC1, which houses a working fluid, but not necessarily. The heat diffuser may have a configuration different from that of the vapor chamber VC. For example, the heat diffuser 5 may be replaced with the heat diffuser 5B shown in FIG. 12.

The heat diffuser 5B includes a support member 5B1, a first sheet 5B2, and a second sheet 5B3, as shown in FIG. 12.

The support member 5B1 is a member having the shape of a planar plate and made of metal, such as aluminum, and supports the first sheet 5B2 and the second sheet 5B3. The support member 5B1 has a first surface 5B11, which is a surface facing the optical element 41, and a second surface 5B12, which is opposite from the first surface 5B11.

The first sheet 5B2 is provided at the first surface 5B11 so as to cover the first surface 5B11 in the direction +Z, and the second sheet 5B3 is provided at the second surface 5B12 so as to cover the second surface 5B12 in the direction −Z. The first sheet 5B2 and the second sheet 5B3 are each formed of a graphite or graphene sheet. That is, the heat diffuser 5B is a heat conductor including at least one of a graphite sheet and a graphene sheet.

The thus configured heat diffuser 5B has a first surface 5B4, a second surface 5B5, an opening 5B6, a contact section 5B7, and an extension 5B8.

The first surface 5B4 is a surface of the heat diffuser 5B that faces the optical element 41. The first surface 5B4 is formed of the first sheet 5B2.

The second surface 5B5 is a surface of the heat diffuser 5B that is opposite from the first surface 5B4. The second surface 5B5 is formed of the second sheet 5B3.

The opening 5B6 is a through port passing through the heat diffuser 5B along the direction +Z, and causes light incident on the optical element 41 to pass therethrough in the direction +Z. The opening 5B6 is formed substantially in a rectangular shape corresponding to the pixel region PA when viewed from the light incident side.

The contact section 5B7 is provided at the first surface 5B4 along the circumferential edge of the opening The contact section 5B7 is in contact with the light incident surface 415A, which is a heat transfer surface, and receives the heat of the optical element 41 via the light incident surface 415A. That is, the contact section is formed of the first sheet 5B2.

The extension 5B8 is the portion of the heat diffuser 5B that extends from the contact section 5B7 in a direction that intersects with the direction in which the light is incidence on the optical element 41. In detail, the extension 5B8 is a portion extending from the contact section 5B7 in the direction +Y, which intersects with the direction +Z. The thermoelectric conversion device 7 is coupled to the portion of the second surface 5B5 that corresponds to the extension 5B8.

In the thus configured heat diffuser 5B, the heat of the optical element 41 transferred to the contact section 5B7, which is in contact with the light incident surface 415A, is diffused in the first sheet 5B2, which constitutes the contact section 5B7, and also transferred to and diffused in the support member 5B1. Furthermore, the heat transferred to the support member 5B1 is transferred to and diffused in the second sheet 5B3. The heat diffused in the heat diffuser 5B is absorbed by the thermoelectric conversion device 7 coupled to the extension 5B8.

The transmissive liquid crystal panels 353A according to the second embodiment can also each employ the heat diffuser 5B in place of the heat diffuser 5. The transmissive liquid crystal panels 353 and 353A each including the heat diffuser 5B in place of the heat diffuser 5 provide the same effects as those provided by the transmissive liquid crystal panels 353 and 353A each including the heat diffuser 5, and further provide the effects below.

The heat diffuser 5B is a heat conductor including at least one of a graphite sheet and a graphene sheet.

The graphite and graphene sheets diffuse the transferred heat in the sheets. Employing a heat conductor including such a sheet as the heat diffuser 5B therefore allows the heat transferred via the light incident surface 415A, which is a heat transfer surface, to be readily transferred to the extension 5B8, and in turn the heat of the optical element 41 transferred to the heat diffuser 5B to be readily absorbed by the thermoelectric conversion device 7. The heat of the optical element 41 can therefore be readily dissipated by the cooler 8 or 8A, whereby the optical element 41 can be cooled at increased efficiency.

It is assumed that the heat diffuser 5B includes the support member 5B1, the first sheet 5B2, and the second sheet 5B3, but not necessarily. The heat diffuser 5B may include only one of the first sheet 5B2 and the second 5B3 sheet. Furthermore, when the optical element 41 and the thermoelectric conversion device 7 can be coupled to each other, the heat diffuser may include the only one sheet, and the support member 5B1 may be omitted.

In each of the embodiments described above, it is assumed that the light transmissive optical element module according to the present disclosure is the transmissive liquid crystal panels 353 or 353A, that the transmissive liquid crystal panels 353 and 353A each include the optical element 41 having the liquid crystal layer 412, and that the optical element 41 is a liquid crystal panel, but not necessarily. The light transmissive optical elements of the light transmissive optical element module may instead each be any optical element having other optical characteristics as long as the optical element causes light to exit along the traveling direction of the light incident thereon. Examples of such a light transmissive optical element may include a polarizer that transmits one of p-polarized light and s-polarized light and absorbs the other, and a wavelength converter containing a phosphor that converts the wavelength of light incident thereon.

In the first embodiment described above, it is assumed that the cooler 8 is a heat sink. In the second embodiment described above, it is assumed that the cooler 8A is a cold plate. The cooler is, however, not limited to any of the components described above.

In each of the embodiments described above, it is assumed that the thermoelectric conversion device 7 is a Peltier device, but not necessarily. A thermoelectric conversion device having any other configuration may be used in the light transmissive optical element module.

In each of the embodiments described above, it is assumed that the light incident surface 415A of the light-incident-side dustproof substrate 415 provided in the optical element 41 is a heat transfer surface that is in contact with the contact section 54 or 5B7 of the heat diffuser 5 or 5B and transfers the heat of the optical element 41 to the heat diffuser 5 or 5B, but not necessarily. Any portion of the optical element 41 other than the light incident surface 415A may be the heat transfer surface. For example, a side surface of at least one of the counter substrate 413, the pixel substrate 414, the light-incident-side dustproof substrate 415, and the light-exiting-side dustproof substrate 416 that intersects with the light incident surface thereof may be the heat transfer surface.

Furthermore, the contact section 54 or 5B7 of the heat diffuser 5 or 5B may not be in direct contact with the optical element 41. For example, the contact section 54 or 5B7 may be in contact with a heat transfer member coupled to the optical element 41 in a heat transferable manner. The same holds true for the thermoelectric conversion device 7 in contact with the extension 55 or 5B8 and the cooler 8 or 8A in contact with the second surface 72 of the thermoelectric conversion device 7.

Furthermore, depending on the arrangement of the heat diffuser 5 or 5B relative to the optical element 41, the heat diffuser 5 or 5B may not have the opening 53 or 5B6. The heat diffuser 5 or 5B, the thermoelectric conversion device 7, and cooler 8 or 8A may be disposed at the light exiting side of the optical element 41.

In the first embodiment described above, it is assumed that the projector 1 includes the three transmissive liquid crystal panels 353B, 353G, and 353R. In the second embodiment described above, it is assumed that the projector includes the three transmissive liquid crystal panels 353AB, 353AG, and 353AR. The configurations described above is, however, not necessarily employed, and the present disclosure is also applicable to a projector including two or less or four or more transmissive liquid crystal panels.

In each of the embodiments described above, the projector including the transmissive liquid crystal panels 353 or 353A exemplifies an electronic instrument including a light transmissive optical element module, but not necessarily. The electronic instrument including a light transmissive optical element module according to the present disclosure is not limited to a projector, and may instead be an electronic instrument having any other configuration. Such an electronic instrument may, for example, be a lighting apparatus.

SUMMARY OF PRESENT DISCLOSURE

The present disclosure will be summarized below as additional remarks.

Additional Remark 1

A light transmissive optical element module including an optical device having a light transmissive optical element that causes light incident thereon to exit and a heat transfer surface via which heat of the light transmissive optical element is transferred, a heat diffuser that includes a contact section in contact with the heat transfer surface and an extension extending from the contact section and diffuses the received heat, a thermoelectric conversion device that has a first surface in contact with the extension and a second surface disposed at a side opposite from the first surface, absorbs via the first surface the heat transferred from the extension, and dissipates the absorbed heat via the second surface, and a cooler in contact with the second surface.

According to the configuration described above, the heat generated at the light transmission optical element is diffused from the contact section of the heat diffuser, which is in contact with the heat transfer surface, to the extension, and then transferred from the extension to the first surface of the thermoelectric conversion device. The thermoelectric conversion device dissipates the heat transferred from the extension to the first surface via the cooler, which is in contact with the second surface. The area over which the heat of the light transmissive optical element is dissipated can thus be expanded, whereby the heat of the light transmissive optical element can be dissipated at increased efficiency. Furthermore, facilitating the thermoelectric conversion device the heat transfer from the first surface to the second surface can facilitate heat transfer from the light transmissive optical element to the cooler, and can in turn increase the efficiency at which the cooler dissipates the heat of the light transmissive optical element. The light transmissive optical element can therefore be cooled at increased efficiency.

Additional Remark 2

In the light transmissive optical element module described in the additional remark 1, the heat diffuser is a vapor chamber including a sealed enclosure that houses a working fluid that changes between a gas phase and a liquid phase, and the contact section and the extension are provided in the sealed enclosure.

According to the configuration described above, when the vapor chamber, which is the heat diffuser, receives the heat of the light transmissive optical element at the contact section via the heat transfer surface, the liquid-phase working fluid changes to the gas-phase working fluid at the contact section and diffuses in the sealed enclosure. The heat of the light transmissive optical element thus diffuses in the sealed enclosure, which includes the extension, and the gas-phase working fluid condenses and changes into the liquid-phase working fluid when the heat is transferred into the sealed enclosure. The condensation of the liquid-phase working fluid occurs at lower-temperature portions of the sealed enclosure. The thermoelectric conversion device thus absorbs the heat via the first surface, so that the heat of the gas-phase working fluid is actively transferred to the extension, which is in contact with the first surface, and the gas-phase working fluid condenses at the same time. The working fluid having changed from the gas phase to the liquid phase moves in the sealed enclosure and reaches the contact section. The heat absorbed from the extension by the thermoelectric conversion device is transferred to the cooler via the second surface and dissipated by the cooler, as described above.

Employing the vapor chamber as the heat diffuser thus allows the cooler to quickly dissipate the heat of the light transmissive optical element. The light transmissive optical element can therefore be cooled at increased efficiency.

Additional Remark 3

In the light transmissive optical element module described in the additional remark 1, the heat diffuser is a heat conductor including at least one of a graphite sheet and a graphene sheet.

The graphite and graphene sheets diffuse the transferred heat in the sheets. Employing a heat conductor including such a sheet as the heat diffuser therefore allows the heat transferred via the heat transfer surface to be readily transferred to the extension, and in turn the heat of the light transmissive optical element transferred to the heat diffuser to be readily absorbed by the thermoelectric conversion device. The heat of the light transmissive optical element can therefore be readily dissipated by the cooler, whereby the light transmissive optical element can be cooled at increased efficiency.

Additional Remark 4

In the light transmissive optical element module described in any one of the additional remarks 1 to 3, the cooler is a heat sink.

According to the configuration described above, which is a relatively simple configuration in which the cooler, which dissipates the heat of the light transmissive optical element transferred from the thermoelectric conversion device, is a heat sink, the heat dissipation area can be expanded. Therefore, the manufacturing cost of the light transmissive optical element module can be reduced, and the size of the light transmissive optical element module can also be reduced.

Additional Remark 5

In the light transmissive optical element module described in any one of the additional remarks 1 to 3, the cooler is a cold plate in which a liquid refrigerant flows.

According to the configuration described above, the heat transferred from the thermoelectric conversion device can be transferred to the liquid refrigerant flowing in the cooler. Causing the liquid refrigerant sufficiently to flow to the cooler therefore allows the light transmissive optical element to be quickly cooled through the combination of the heat diffusion performed by the heat diffuser and the heat absorption performed by the thermoelectric conversion device. The light transmissive optical element can therefore be cooled at increased efficiency.

Additional Remark 6

In the light transmissive optical element module described in any one of the additional remarks 1 to 5, the thermoelectric conversion device is a Peltier device.

According to the configuration described above, in which the thermoelectric conversion device is a Peltier device, the heat can be actively absorbed from the extension of the heat diffuser, and the heat of the light transmissive optical element can in turn be efficiently dissipated to the cooler. The light transmissive optical element can therefore be cooled at increased efficiency.

Additional Remark 7

In the light transmissive optical element module described in the additional remark 6, the light transmissive optical element is a liquid crystal panel that includes a liquid crystal layer, which modulates light incident thereon in a first direction, and causes the modulated light to exit in the first direction, and the heat diffuser transfers the heat supplied from the Peltier device to the liquid crystal panel via the contact section.

When the temperature of the liquid crystal layer is low, the response of the liquid crystal molecules may decrease, and an image to be formed is likely to deteriorate. In particular, to form images at a high frame rate, the image formation may not be able to keep up with the frame rate, and the images according to an image signal inputted to the liquid crystal panel may not be formed.

In such a case, the thermoelectric conversion device, which is a Peltier device, can heat the liquid crystal panel via the heat diffuser to increase the temperature of the liquid crystal layer. A decrease in the response of the liquid crystal molecules can therefore be suppressed.

On the other hand, when the temperature of the liquid crystal layer is high, the liquid crystal molecules tend to deteriorate, and the life of the liquid crystal panel tends to shorten. In contrast, the thermoelectric conversion device actively absorbs the heat of the liquid crystal panel via the heat diffuser to facilitate the dissipation of the heat of the liquid crystal panel to the cooler.

When the liquid refrigerant in direct or indirect contact with the liquid crystal panel is heated to heat the liquid crystal panel, it is difficult to quickly adjust the temperature of the liquid crystal molecules because of the high specific heat of the liquid refrigerant. In contrast, the thermoelectric conversion device disposed between the heat diffuser and the cooler is a Peltier device, and the thermoelectric conversion device absorbs the heat from the heat diffuser or heats the heat diffuser, whereby the temperature of the liquid crystal panel can be quickly adjusted. The temperature of the liquid crystal molecules of the liquid crystal panel can thus be quickly adjusted, whereby deterioration of an image to be formed can be suppressed.

Additional Remark 8

An electronic instrument including the light transmissive optical element module described in any one of the additional remarks 1 to 7.

According to the configuration described above, the electronic instrument can provide the same effects as those provided by the light transmissive optical element module.

What is claimed is:

1. A light transmissive optical element module comprising:

an optical device having a light transmissive optical element that causes light incident thereon to exit and a heat transfer surface via which heat of the light transmissive optical element is transferred;

a heat diffuser that includes a contact section in contact with the heat transfer surface and an extension extending from the contact section and diffuses the received heat;

a thermoelectric conversion device that has a first surface in contact with the extension and a second surface disposed at a side opposite from the first surface, absorbs via the first surface the heat transferred from the extension, and dissipates the absorbed heat via the second surface; and a cooler in contact with the second surface;

wherein:

the thermoelectric conversion device is a Peltier device;

the light transmissive optical element is a liquid crystal panel that includes a liquid crystal layer, which modulates light incident thereon in a first direction, and causes the modulated light to exit in the first direction, and the heat diffuser transfers the heat supplied from the Peltier device to the liquid crystal panel via the contact section.

2. The light transmissive optical element module according to claim 1, wherein the heat diffuser is a vapor chamber including a sealed enclosure that houses a working fluid that changes between a gas phase and a liquid phase, and the contact section and the extension are provided in the sealed enclosure.

3. The light transmissive optical element module according to claim 1, wherein the heat diffuser is a heat conductor including at least one of a graphite sheet and a graphene sheet.

4. The light transmissive optical element module according to claim 1, wherein the cooler is a heat sink.

5. The light transmissive optical element module according to claim 1, wherein the cooler is a cold plate in which a liquid refrigerant flows.

6. An electronic instrument comprising the light transmissive optical element module according to claim 1.

7. A light transmissive optical element module comprising:

an optical device having a light transmissive optical element that causes light incident thereon to exit and a heat transfer surface via which heat of the light transmissive optical element is transferred;

a heat diffuser that includes a contact section in contact with the heat transfer surface and an extension extending from the contact section and diffuses the received heat;

a thermoelectric conversion device that has a first surface in contact with the extension and a second surface disposed at a side opposite from the first surface, absorbs via the first surface the heat transferred from the extension, and dissipates the absorbed heat via the second surface; and a cooler in contact with the second surface;

wherein the heat diffuser is a vapor chamber including a sealed enclosure that houses a working fluid that changes between a gas phase and a liquid phase, and the contact section and the extension are provided in the sealed enclosure.

8. The light transmissive optical element module according to claim 7, wherein the cooler is a heat sink.

9. The light transmissive optical element module according to claim 7, wherein the cooler is a cold plate in which a liquid refrigerant flows.

10. The light transmissive optical element module according to claim 7, wherein the thermoelectric conversion device is a Peltier device.

11. The light transmissive optical element module according to claim 10, wherein the light transmissive optical element is a liquid crystal panel that includes a liquid crystal layer, which modulates light incident thereon in a first direction, and causes the modulated light to exit in the first direction, and the heat diffuser transfers the heat supplied from the Peltier device to the liquid crystal panel via the contact section.

12. An electronic instrument comprising the light transmissive optical element module according to claim 7.

\* \* \* \* \*